United States Patent [19]

Miyao et al.

[11] 4,221,179
[45] Sep. 9, 1980

[54] BUTTON SIZE CONTROL IN AN AUTOMATIC ELECTRONIC SEWING MACHINE

[75] Inventors: Nobuyoshi Miyao, Sakurai; Hirotoshi Matsui, Shiki; Nobukazu Isoyama, Sakurai; Susumu Nonaka, Yamatokoriyama; Masayasu Makino, Gose; Kazuo Suzuki, Higashiosaka; Hirokazu Koda, Gose, all of Japan

[73] Assignee: Sharp Kabushiki Kaisha, Osaka, Japan

[21] Appl. No.: 923,340

[22] Filed: Jul. 10, 1978

[30] Foreign Application Priority Data

Jul. 13, 1977 [JP] Japan .................................. 52/83886
Jul. 13, 1977 [JP] Japan .................................. 52/83887

[51] Int. Cl.$^2$ .......................... D05B 3/02; D05B 3/14
[52] U.S. Cl. .................................. 112/158 E; 112/111
[58] Field of Search .................... 112/158 E, 110, 111, 112/112, 158 B; 318/571

[56] References Cited

U.S. PATENT DOCUMENTS

| 2,969,755 | 1/1961 | Reece | 112/112 |
| 3,036,534 | 5/1962 | Martines | 112/111 |
| 4,016,821 | 4/1977 | Minalga | 318/571 X |

FOREIGN PATENT DOCUMENTS 2746946  4/1978  Fed. Rep. of Germany ....... 112/158 E Primary Examiner—Peter P. Nerbun
Attorney, Agent, or Firm—Birch, Stewart, Kolasch & Birch

[57] ABSTRACT

In an automatic electronic sewing machine including a read only memory (ROM) and a random access memory (RAM), a needle is controlled to swing in order to shift the penetration position. In a button mode, the needle is controlled to swing to a predetermined position corresponding to one of a pair of throughholes formed in a button, and the other swing position corresponding to the other of the pair of throughholes formed in the button is variably controlled in response to the size of the button.

8 Claims, 18 Drawing Figures

| | X | Y |
|---|---|---|
| | 0 | 15 |
| | 0 | 15 |
| | 0 | 15 |
| (4) | 19 | 15 |
| | 0 | 15 |
| (6) | 19 | 15 |
| | 0 | 15 |
| (8) | 19 | 15 |
| | 0 | 15 |

BUTTON SIZE CONTROL IN AN AUTOMATIC ELECTRONIC SEWING MACHINE

BACKGROUND AND SUMMARY OF THE INVENTION

The present invention relates to an automatic electronic sewing machine and, more particularly, to the button mode control in an automatic electronic sewing machine.

An automatic electronic sewing machine including a read only memory (ROM) and a random access memory (RAM) is proposed in copending application, AUTOMATIC ELECTRONIC SEWING MACHINE, Ser. No. 843,639, filed Oct. 19, 1977 by Tousaku Nakanishi, Kazuo Suzuki, Masayasu Makino, Nobuyoshi Miyao and Hirokazu Koda and assigned to the same assignee as the present application.

In such an automatic electronic sewing machine, button operation is difficult to perform when a distance provided between two throughholes formed in a button varies.

Accordingly, an object of the present invention is to provide a novel control system for performing button operation in an automatic electronic sewing machine.

Another object of the present invention is to facilitate button operation in an automatic electronic sewing machine.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a needle is controlled to shift to the leftmost position when performing button operation. One of a pair of throughholes formed in a button is adjusted to locate at the leftmost position of the needle swing. The swing amplitude of the needle is variably adjusted so that the needle penetrates the other of the pair of throughholes when the needle position is shifted from the leftmost position. The swing amplitude is controlled by varying the gain amplitude of the needle shift control mechanism, or by digitally varying output signals derived from a control logic including a random access memory (RAM).

In a preferred form, an indication lamp is provided on a control panel to indicate that the preceding stitch pattern formation is completed. In case where the indication lamp is not enabled when the operator selects the button operation, the button operation is not ready for stable operation.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 6 is a block diagram of another embodiment of a control circuit for developing a control signal AS;

FIGS. 8(A) through 8(G) are charts for explaining pattern data read-out operation in the automatic electronic sewing machine of FIGS. 2(A) and 2(B);

DESCRIPTION OF THE PREFERRED EMBODIMENTS

Referring now in detail to the drawings, and to facilitate a more complete understanding of the present invention, button operation conducted by a conventional automatic electronic sewing machine will be first described with reference to FIG. 1.

In the conventional automatic electronic sewing machine, when conducting button operation, a needle is controlled to swing right and left from a center position C by a predetermined value. Therefore, it is required to strictly adjust the center of a button to the center position C of the needle swing. The above adjustment is difficult to perform. In addition, when a distance l provided between a pair of throughholes is varied, it is very difficult to determine the swing amplitude of the needle, because the needle is controlled to swing right and left from the center position C.

The present invention is to minimize the above-mentioned difficulties of button operation. In the button mode, the needle is first shifted to the leftmost position to which one of a pair of throughholes formed in the button is adjusted. The opposing penetration position is controlled in accordance with a distance provided between the pair of throughholes.

Figure 2A:
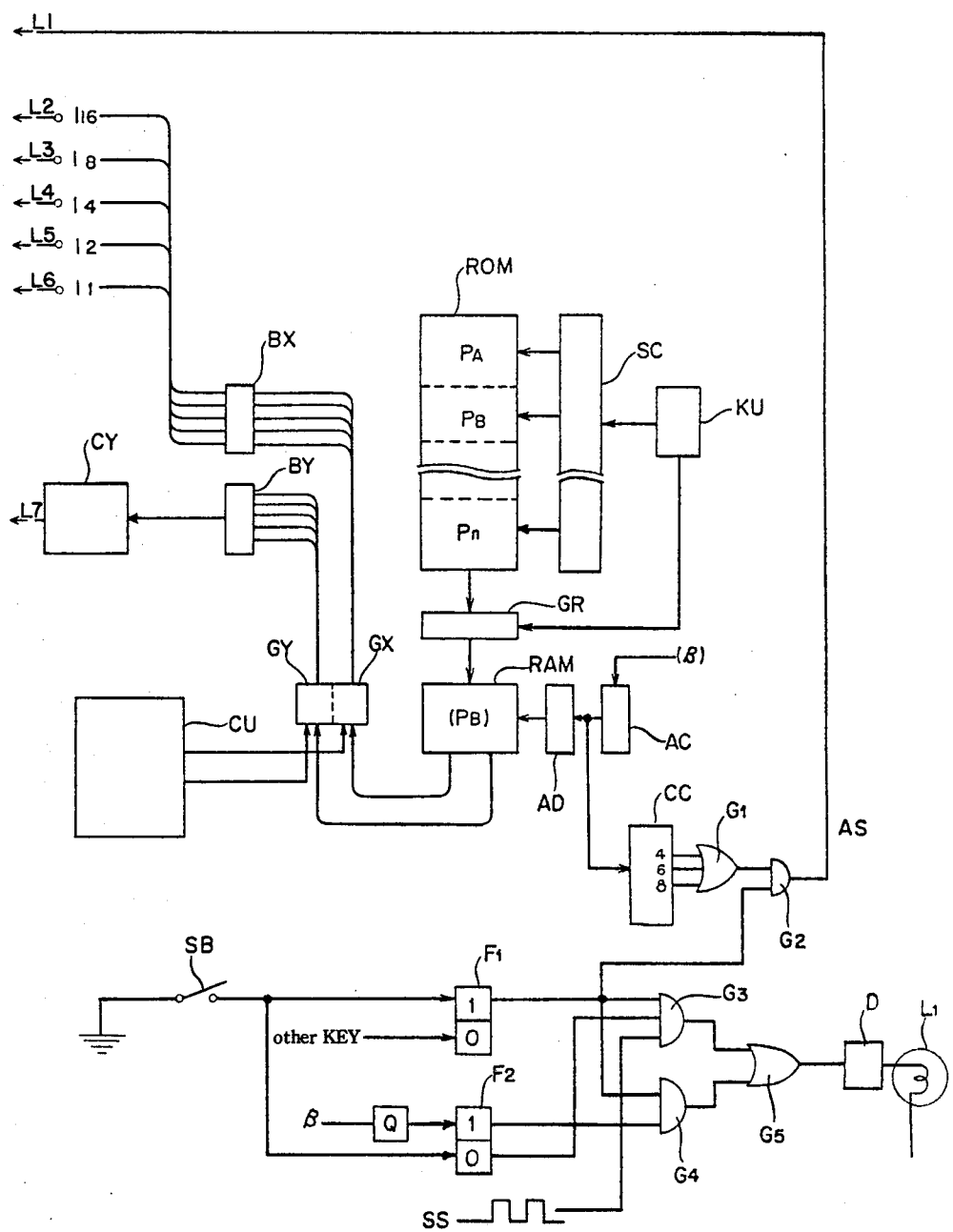
FIGS. 2(A) and 2(B) are block diagrams of an embodiment of a control system of an automatic electronic sewing machine of the present invention.
Figure 2B:
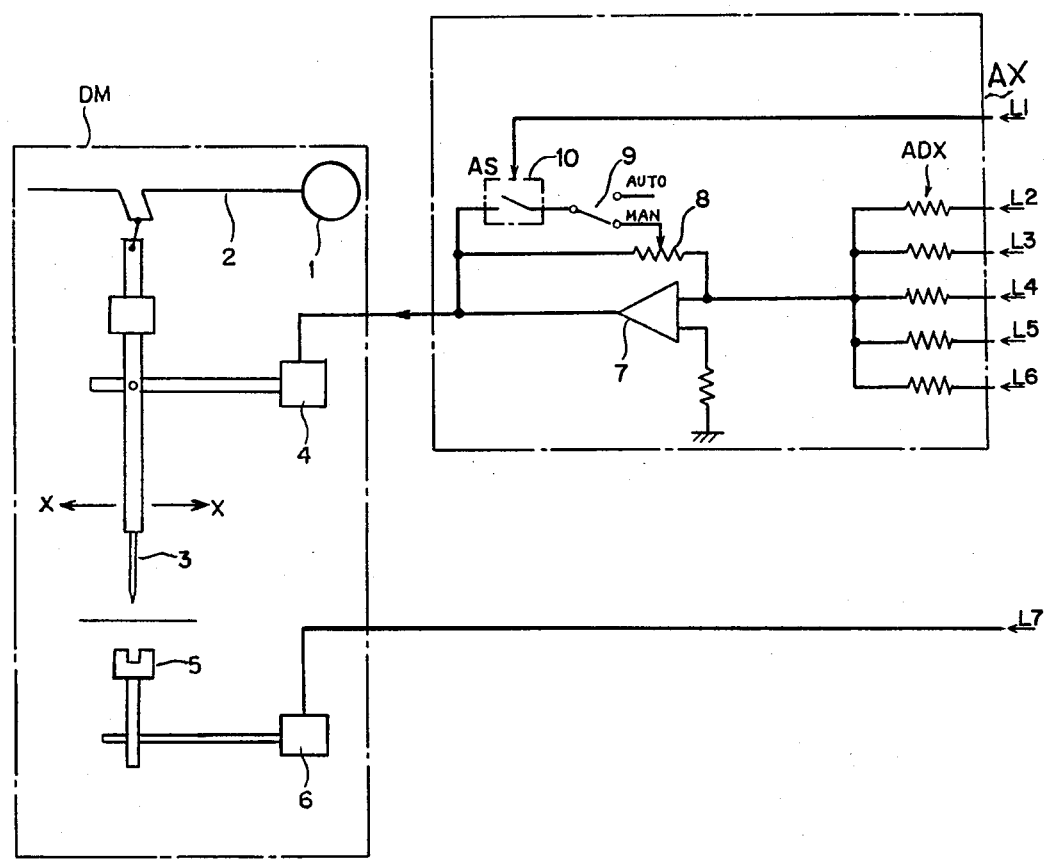

FIGS. 2(A) and 2(B) show an embodiment of a control system of an automatic electronic sewing machine of the present invention.

A mechanical portion DM includes a motor 1 which is operated through a foot switch (not shown). When the motor 1 is rotated, a main shaft 2 is rotated and, then, a needle 3 is driven to perform the penetration operation. A linear motor 4 is associated with the needle 3 to swing the needle 3 right and left in the X-direction. The mechanical portion DM further includes a work feed dog 5 driven by a linear motor 6.

A needle position control stage AX develops a control signal toward the linear motor 4 for swinging the needle 3 in the X-direction. The needle position control stage AX mainly comprises an amplifier 7 which is connected to receive a data signal in the X-direction from a control stage and develops the control signal toward the linear motor 4 for swinging the needle 3 in accordance with the data signal.

A variable resistor 8 is interposed in a feedback loop from the output terminal to the input terminal of the amplifier 7 for determining the gain of the amplifier 7. The movable contact of the variable resistor 8 is connected to the output terminal of the amplifier 7 via a manual/auto selection switch 9 and an analog switch 10. The analog switch 10 is turned ON by a control signal AS which is derived from the control stage at a time when the needle 3 is driven to shift rightward in the button mode operation.

Now assume that the manual/auto selection switch 9 is inclined to the manual mode terminal. When the needle 3 is driven to swing leftward, the analog switch 10 is OFF and, therefore, the gain of the amplifier 7 is determined by the total resistance of the variable resistor 8. Contrarily, when the needle 3 is driven to swing rightward, the analog switch 10 is ON and, therefore, the gain of the amplifier 7 is adjustable by sliding the movable contact of the variable resistor 8. That is, the swing amplitude of the needle 3 toward right is adjustable through the use of the variable resistor 8. In case where the manual/auto selection switch 9 is inclined to the auto mode terminal, the gain of the amplifier 7 is determined by the total resistance of the variable resistor 8 irrespective of the fact whether the needle 3 is swung rightward or leftward.

The control stage is incorporated in an LSI. The control stage mainly comprises a read only memory ROM for storing digital data of various stitch patterns. The digital data stored in the read only memory ROM are introduced into a random access memory RAM in response to a command derived from pattern selection keys. That is, the read only memory ROM stores the digital coordinate data for each stitch of various stitch patterns. FIG. 3 shows an example of digital data stored in the read only memory ROM for conducting the button operation. The X section represents the positioning coordinates of the needle 3, and the Y section represents feed values of the word feed dog 5.

The digital pattern data temporarily stored in the random access memory RAM are led out in the stitch by stitch mode in response to a synchronization signal β, which represents the rotation of the main shaft 2. The thus developed digital pattern data are converted into an analog signal for controlling the needle swing and the word feed table movement.

The positioning control of the needle 3 and the work feed dog 5 is conducted at a time when the needle 3 is separated from the work. Operation of the control stage is controlled by a central processor unit CU.

Figure 4:
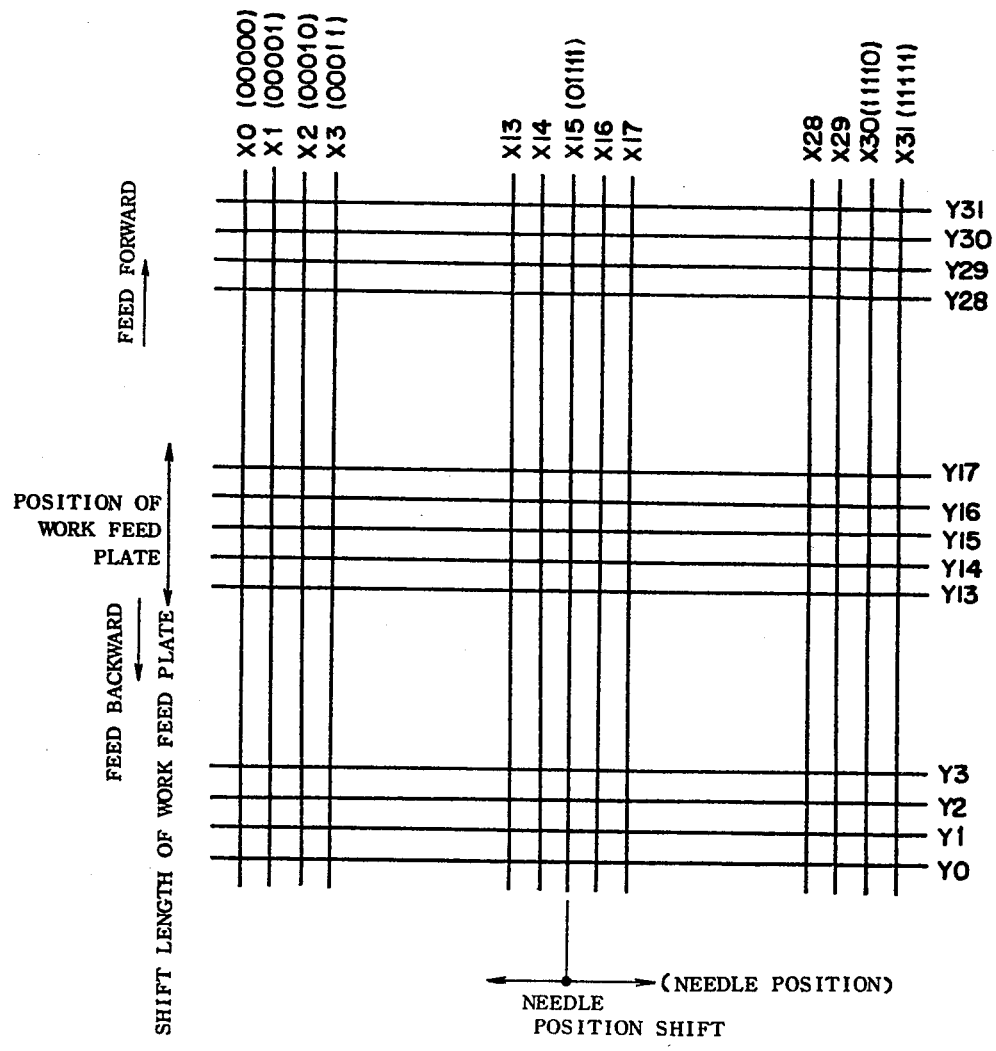
FIG. 4 is a chart showing coordinates of a needle position and a work feed plate position.

The needle position can be selected from thirty-two (32) positions $X_0$ through $X_{31}$, and the work feed table position can be selected from thirty-two (32) positions $Y_0$ through $Y_{31}$. That is, the stitch pattern can be formed in a matrix of 32×32 as shown in FIG. 4.

More specifically, the random access memory RAM stores the positioning information in the following manner.

| X COORDINATES | NEEDLE POSITION | RAM DATA |
|---|---|---|
| $X_0$ | maximum shift in the positive direction | 00000 |
| . | . | . |
| . | . | . |
| . | . | . |
| $X_{15}$ | center | 01111 |
| . | . | . |
| . | . | . |
| . | . | . |
| $X_{31}$ | maximum shift in the negative direction | 11111 |
| Y COORDINATES | WORK FEED TABLE POSITION | RAM DATA |
| $Y_0$ | maximum feed in the negative direction | 00000 |
| . | . | . |
| . | . | . |
| . | . | . |
| $Y_{15}$ | center | 01111 |
| . | . | . |
| . | . | . |
| . | . | . |
| $Y_{31}$ | maximum feed in the positive direction | 11111 |

Referring again to FIGS. 2(A) and 2(B), the control stage further comprises a key input KU including selection switches (not shown) for selecting a desired stitch pattern.

The read only memory ROM comprises plural sections $P_A$, $P_B$, --- $P_n$, each of which stores pattern data of different patterns. Each section of the read only memory ROM is selected through a section selection circuit SC in accordance with the selection commands, and the pattern data stored in the selected section are transferred to the random access memory RAM via a gate circuit GR. The digital data for performing the button operation are stored in the section $P_B$.

An address counter AC is associated with the random access memory RAM. The address counter AC is connected to receive the synchronization signal β, which is developed in synchronization with the rotation of the main shaft 2. Upon receiving the synchronization signal β, the address counter AC develops an output signal, which is applied to an address decoder AD in order to address a desired stop of the random access memory RAM. The digital data temporarily stored in the random access memory RAM as shown in FIG. 3 are sequentially read out from the bottom.

The X and Y coordinates data read out from the random access memory RAM are transferred to registers BX and BY through gates GX and GY, respectively, which are controlled their open/close operation by control signals derived from the central processor unit CU. The digital data introduced into the register BX are converted into an analog signal by a digital-to-analog converter ADX, and applied to the amplifier 7. The digital data introduced into the register BY are converted into an analog signal by a converter CY, and applied to the linear motor 6 for driving the work feed table.

Figures 1, 3:
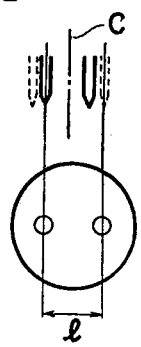
FIG. 1 is a schematic view for explaining button operation in a conventional automatic electronic sewing machine.
FIG. 3 is a chart showing digital data for conducting button operation.

A detection circuit CC is connected to receive the output signal of the address counter AC in order to develop a detection output when the addresses "8", "6" and "4" of the random access memory RAM shown in FIG. 3 are selected. The detection output of the detection circuit CC is applied to an AND gate $G_2$ through an OR gate $G_1$. An output signal of the AND gate $G_2$ is the control signal AS to be applied to the analog switch 10.

SB represents a button mode selection key. When the button mode selection key SB is depressed, a flip-flop $F_1$ is set, and the set output of the flip-flop $F_1$ is applied to the AND gate $G_2$.

Now assume that the button mode selection key SB is depressed, and the manual/auto selection switch 9 is inclined to the manual mode terminal. The flip-flop $F_1$ is set as discussed above, and the section $P_B$ of the read only memory ROM is selected through the section selection circuit SC. Accordingly, the data information shown in FIG. 3 is transferred to the random access memory RAM through the gate circuit GR.

Under these conditions the main shaft 2 is manually rotated. In response to the rotation of the main shaft 2, the synchronization signal $\beta$ is developed and the needle 3 is driven to move downward and upward. The synchronization signal $\beta$ is applied to the address counter AC, and the contents of the address counter AC are increased one upon every generation of the synchronization signal $\beta$. When the contents of the address counter AC are one (1), the bottommost data "0" and "15" stored in the random access memory RAM shown in FIG. 3 are read out. The thus read out data "0" are transferred to the register BX and, then, converted into an analog signal by the digital-to-analog converter ADX. The thus obtained analog signal is applied to the amplifier 7.

Figure 5:
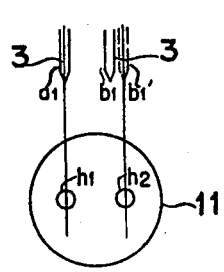
FIG. 5 is a schematic view for explaining button operation in an embodiment of an automatic electronic sewing machine of the present invention.

At this moment, the detection output is not developed from the detection circuit CC. The control signal AS is not developed and, hence, the analog switch 10 is OFF. The amplifier 7 develops an output signal corresponding to an output signal of the digital-to-analog converter ADX and determined by the total resistance of the variable resistor 8. The needle 3 is swung to the leftmost position $X_0$ shown in FIG. 4. Under these conditions the needle 3 penetrates a throughhole $h_1$ of a button 11 as shown in FIG. 5.

When the main shaft 2 further rotates, the following synchronization signal $\beta$ is developed toward the address counter AC. The second data "19", "15" from the bottom of the random access memory RAM shown in FIG. 3 are read out, and the data "19" are converted to the analog signal and, then, applied to the amplifier 7 in such a manner as discussed above.

At this moment, the detection circuit CC detects that the address (8) is selected, and develops the control signal AS to turn on the analog switch 10. Therefore, the gain of the amplifier 7 becomes adjustable through the use of the variable resistor 8. That is, the position of the needle 3 is adjustable through the use of the variable resistor 8. For example, when the needle 3 is located at a position $b_1$ as shown in FIG. 5, the needle position can be shifted to a position $b_1'$ corresponding to a throughhole $h_2$ of the button 11 as shown in FIG. 5 through the use of the variable resistor 8.

After completion of the above-mentioned needle position set operation, the motor 1 is rotated through the foot switch. The synchronization signal $\beta$ is developed in response to the rotation of the main shaft 2, and the contents of the address counter AC are increased one by one. The data information stored in the random access memory RAM is sequentially read out to swing the needle 3 between the positions $a_1$ and $b_1'$. The needle 3 penetrates the throughholes $h_1$ and $h_2$ to conduct the button operation.

When the button operation is desired to be conducted to another button which has throughholes between which distance is different from the preceding one, one of the throughholes is set to locate at the position $a_1$. And, the variable resistor 8 is adjusted so that the needle 3 is located at the other throughhole when the needle 3 is swung right in such a manner as discussed above.

In case where the manual/auto selection switch 9 is inclined to the auto mode terminal, the gain of the amplifier 7 is determined by the total resistance of the variable resistor 8 irrespective of the fact whether the needle 3 is swung rightward or leftward. It is preferable that the swing amplitude of the needle 3 in the auto mode is adjusted to the maximum distance of the throughholes of the commercially available button.

Figure 6:
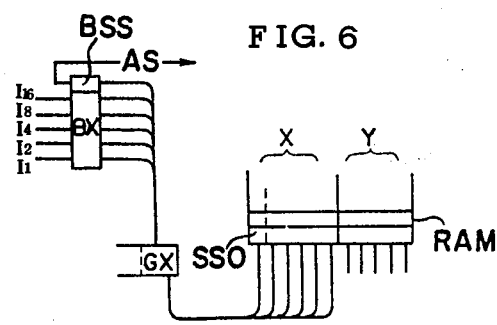
Figure 6:
Figure 8B:
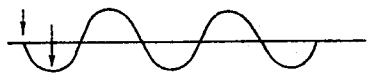
Figure 6:
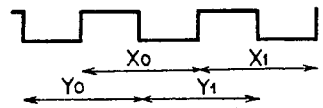
Figure 8D:
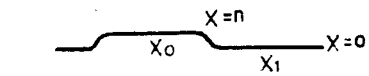
Figure 8E:
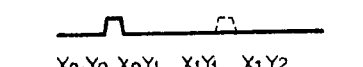
Figure 6:
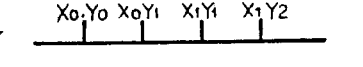
Figure 6:
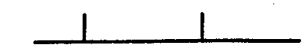

FIG. 6 shows a portion of another embodiment of the control stage for developing the control signal AS. Like elements corresponding to those of FIGS. 2(A) and 2(B) are indicated by like numerals.

The random access memory RAM includes an additional bit SSO in the X section. The bit SSO stores the information "1" at positions corresponding to the addresses (4), (6) and (8) of FIG. 3. The information "1" stored in the bit SSO is applied through the gate GX to an additional bit BSS of the register BX. The information "1" temporarily stored in the bit BSS of the register BX is applied to the analog switch 10 as the control signal AS.

Figure 7:
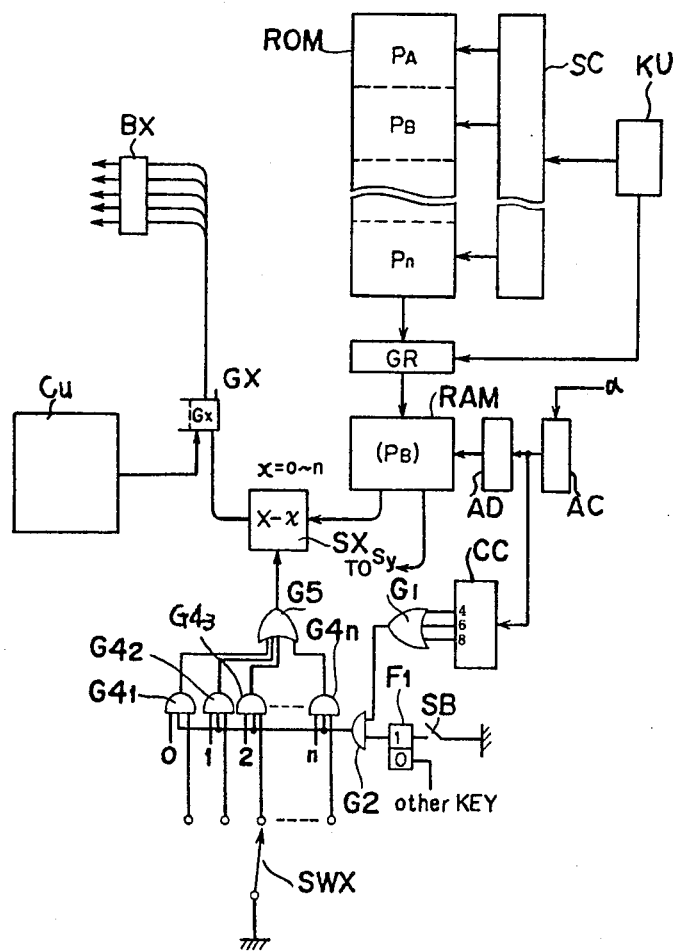
FIG. 7 is a block diagram of a portion of another embodiment of a control system of the automatic electronic sewing machine of the present invention.

FIG. 7 shows a portion of still another embodiment of the control stage. Like elements corresponding to those of FIGS. 2(A) and 2(B) are indicated by like numerals.

The digital data stored in the X section of the random access memory RAM are introduced into a subtractor SX, of which an output signal is applied to the register BX through the gate GX.

A multi-step selection switch SWX is provided for adjusting the swing amplitude of the needle 3. Each contact of the multi-step selection switch SWX is connected to the input terminal of AND gates $G4_1$ through $G4_n$. The AND gates $G4_1$ through $G4_n$ are connected to receive weighted signals "0" through "n", and the control signal AS derived from the OR gate $G_1$ and the AND gate $G_2$. Respective output signals of the AND gates $G4_1$ through $G4_n$ are applied to the subtractor SX through an OR gate $G_5$. The embodiment of FIG. 7 does not require the variable resistor 8, the manual/auto selection switch 9 and the analog switch 10 shown in FIGS. 2(A) and 2(B).

Now assume that the multi-step selection switch SWX is selected at the third step as shown in FIG. 7. When the control signal AS is developed, that is, when the data "19" shown in FIG. 3 are read out, the numeral information "2" is applied through the AND gate $G4_3$ to the subtractor SX. The subtractor SX functions to perform the calculation (19-2), and develops the data "17" toward the register BX. In this way, the right shift value of the needle 3 is modified. At the moment when the data "0" are read out from the random access memory RAM, the AND gate $G_2$ is OFF and, therefore, the subtraction data are not applied to the subtractor SX. Accordingly, the data "0" derived from the random access memory RAM are applied to the register BX without modification. That is, the needle 3 is shifted left without modification.

It will be clear that the swing amplitude of the needle 3 can be adjusted by selecting a desired step of the multi-step selection switch SWX, because the subtraction data to be applied to the subtractor SX are varied in accordance with the selection of the multi-step selection switch SWX.

FIGS. 8(A) through 8(G) show data read out timings and the needle penetration timings. In case where any one of the pattern selection keys, for example, the button mode key SB is depressed under the condition where the tip end of the needle 3 is positioned below the work, the needle 3 is shifted to the first stitch position for the button operation when the needle 3 is separated from the work.

Contrarily, when the button mode key SB is depressed under the condition where the needle 3 is separated from the work, the needle 3 is shifted to the position determined by the last data of the preceding stitch pattern. Accordingly, the needle 3 can not be located at the first stitch position of the button operation when the needle 3 first penetrates the work. In this case, the needle 3 must be controlled to penetrate the work once before the button is set at a predetermined position.

To facilitate the above operation, the automatic electronic sewing machine of the present invention comprises an indication lamp for indicating the condition wherein the button mode key SB is depressed, and another indication lamp for indicating the condition wherein the button operation is in the stand-by condition.

Referring again to FIGS. 2(A) and 2(B), the output signal of the flip-flop $F_1$ is also applied to AND gates $G_3$ and $G_4$.

An R-S type flip-flop $F_2$ comprises a set input terminal connected to receive an output signal of a one-shot multivibrator Q which is driven by the synchronization pulse $\beta$, and a reset input terminal connected to receive the output signal of the button mode selection key SB. The set output signal of the flip-flop $F_2$ is applied to the AND gate $G_4$, and the reset output signal of the flip-flop $F_2$ is applied to the AND gate $G_3$. Output signals of the AND gates $G_3$ and $G_4$ are applied to a driver circuit D through an OR gate $G_5$ for driving an indication lamp $L_1$.

Figure 9:
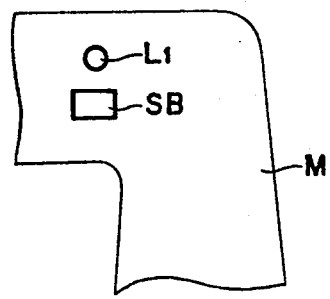
FIG. 9 is a front view of a control panel of the automatic electronic sewing machine of FIGS. 2(A) and 2(B)

The AND gate $G_3$ is also connected to receive a pulse signal SS of a predetermined frequency. The indication lamp $L_1$ is located on a control panel M of the automatic electronic sewing machine, near the button mode selection key SB as shown in FIG. 9.

In case where the needle 3 is separated from the work at the beginning of the button operation, the synchronization signal $\beta$ takes the logic "1". The one-shot multivibrator Q is constructed so that it develops the output signal when the input signal is changed from the logic "0" to the logic "1". Accordingly, the one-shot multivibrator Q does not develop the output signal. Under these conditions when the button mode selection key SB is depressed, the flip-flop $F_1$ is set and develops the set output signal toward the AND gate $G_3$. The AND gate $G_3$ functions to transfer the pulse signal SS to the OR gate $G_5$, whereby the indication lamp $L_1$ is driven to flicker.

The flickering of the indication lamp $L_1$ indicates the fact that the preceding stitch pattern formation is not completed. The operator must manually rotate the main shaft 2 in order to drive the needle 3 to penetrate the work once. With this operation, the synchronization pulse $\beta$ is sequentially changed "1", "0" and "1", and the flip-flop $F_2$ is set by the output signal of the one-shot multivibrator Q at a time when the synchronization signal $\beta$ is changed from the logic "0" to the logic "1". The set output signal of the flip-flop $F_2$ is applied to the AND gate $G_4$, of which the output signal is applied to the driver circuit D to continuously enable the indication lamp $L_1$. The continuous energization of the indication lamp $L_1$ indicates the fact that the preceding pattern formation is completed.

Under these conditions, the bottommost data "0", "15" stored in the random access memory RAM shown in FIG. 3 are read out and supplied to the registers BX and BY.

Contrarily, in case where the tip end of the needle 3 is located below the work at a time when the button mode selection key SB is depressed, the synchronization pulse $\beta$ takes the logic "0" and, therefore, the flip-flop $F_1$ is in the set state and the flip-flop $F_2$ is in the reset state. The AND gate $G_3$ is ON to flicker the indication lamp $L_1$. The operator recognizes the fact that the preceding pattern formation is not completed. When the main shaft 2 is manually rotated, the synchronization pulse $\beta$ is changed from the logic "0" to the logic "1" in response to the separation of the needle 3 from the work and, hence, the flip-flop $F_2$ is turned set. At this moment, the AND gate $G_4$ is turned on to continuously enable the indication lamp $L_1$. In synchronization with the change of the logic value of the synchronization pulse $\beta$ from "0" to "1", the data "0", "15" are transferred to the register BX and BY, respectively.

Figure 10:
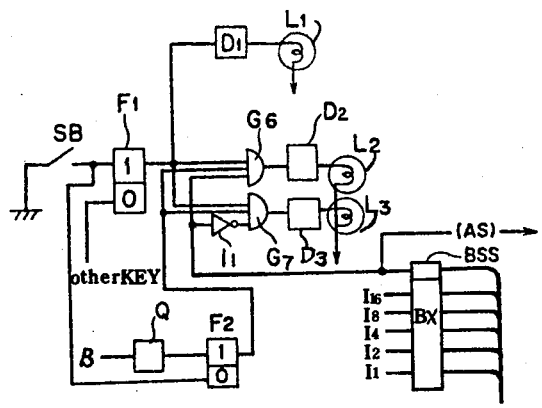
FIG. 10 is a block diagram of a portion of still another embodiment of a control system of the automatic electronic sewing machine of the present invention.
Figure 11:
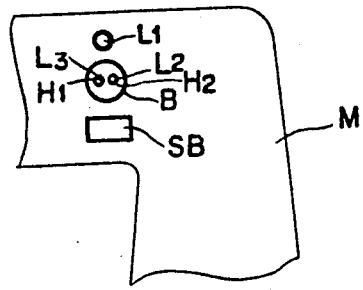
FIG. 11 is a front view of a control panel of the automatic electronic sewing machine of FIG. 10.

FIGS. 10 and 11 show a portion of yet another embodiment of the automatic electronic sewing machine of the present invention, wherein indication lamps $L_2$ and $L_3$ are additionally provided for indicating the needle position. Like elements corresponding to those of FIGS. 2(A), 2(B), 6 and 9 are indicated by like numerals.

The indication lamps $L_2$ and $L_3$ are located at positions corresponding to holes $H_1$ and $H_2$, respectively, of button shaped label B formed on the control panel M of the automatic electronic sewing machine.

The control circuit of FIG. 10 mainly comprises the flip-flops $F_1$ and $F_2$, AND gates $G_6$ and $G_7$, and an inverter $I_1$.

When the button mode selection key SB is depressed, the flip-flop $F_1$ is set to enable the indication lamp $L_1$. In case where the tip end of the needle 3 is positioned below the work at a time when the button mode selection key SB is depressed, the flip-flop $F_2$ is in the reset state. The AND gates $G_6$ and $G_7$ are OFF and, therefore, the indication lamps $L_2$ and $L_3$ are not enabled. Under these conditions, the main shaft 2 is manually rotated to move the needle 3 upward. The flip-flop $F_2$ is set at a time when the synchronization pulse $\beta$ is changed to the logic "1". The AND gate $G_7$ is turned on to enable the indication lamp $L_3$ via a driver circuit $D_3$. The indication lamp $L_3$ indicates that the following stitch will be formed at the hole $H_1$. Under these conditions, the bottommost data stored in the random access memory RAM are read out, and the needle 3 is shifted to the position $X_0$.

When the needle 3 is separated from the work after formation of the first stitch at the throughhole $h_1$, the synchronization pulse $\beta$ takes the logic "1", and the second data from the bottom of the random access memory RAM are read out. The bit BSS receives the information "1" to turn on the AND gate $G_6$ and turn off the AND gate $G_7$. The indication lamp $L_2$ is enabled via a driver circuit $D_2$, thereby indicating that the following stitch will be formed at the hole $H_2$, or, the throughhole $h_2$.

The invention being thus described, it will be obvious that the same may be varied in many ways. Such variations are not to be regarded as a departure from the spirit and scope of the invention, and all such modifications are intended to be included within the scope of the followings claims.

What is claimed is:

1. In an automatic electronic sewing machine which performs a button sewing operation on a button including at least a pair of spaced apart holes therethrough by shifting a needle between said holes in response to an output signal of a control circuit, said control circuit comprising:
   first means for shifting the needle to a first fixed predetermined position corresponding to one hole formed in said button;
   second means for shifting the needle to a second position corresponding to another hole formed in said button; and
   modification means for varying the distance shifted by said needle from said first fixed predetermined position to the second position in response to the distance between the spaced apart holes in the button.

2. The automatic electronic sewing machine of claim 1 having the capability of performing a desired stitch pattern from any of a plurality of stitch patterns, wherein said control circuit further comprises:
   a read only memory for storing digital data corresponding to plural stitch patterns;
   selection means for selecting a desired stitch pattern from the plural stitch patterns stored in said read only memory;
   a random access memory for temporarily storing the digital data of the desired stitch pattern derived from the read only memory; and
   means for applying said digital data temporarily stored in said random access memory to said first and second means for shifting the needle.

3. The automatic electronic sewing machine of claim 2, wherein said modification means comprise a digital circuit means modifying the digital data temporarily stored in said random access memory before said data are applied to said second means.

4. The automatic electronic sewing machine of claim 3, wherein said digital circuit means comprises a subtractor and means for selecting a desired subtraction value to be subtracted from said digital data temporarily stored in said random access memory.

5. The automatic electronic sewing machine of claim 1, 2, or 3, wherein said second means comprise an amplifier, and said modification means include variation means for varying the gain of said amplifier.

6. The automatic electronic sewing machine of claim 5, wherein said variation means comprise a variable resistor interposed within a feedback loop of said amplifier.

7. The automatic electronic sewing machine of claim 5, which further comprises an indication lamp for indicating whether the preceding desired pattern is completed when the button operation is desired to be performed.

8. The automatic electronic sewing machine of claim 1, 2, 3, 4 or 5, which further comprises an indication lamp for indicating whether the preceding desired pattern is completed when the button operation is desired to be performed.

* * * * *